United States Patent [19]
Kitchen et al.

[11] Patent Number: 6,156,431
[45] Date of Patent: Dec. 5, 2000

[54] EXTRACTION MATERIAL COMPRISING TREATED SILICA AND METHOD FOR DETERMINATION OF GAMMA-HYDROXYBUTYRATE

[75] Inventors: Chester J. Kitchen, Bensalem; Thomas F. August, Glenolden; William L. Ozanich, Bensalem; Michael J. Telepchak, Yardley, all of Pa.

[73] Assignee: United Chemical Technologies, Inc., Bristol, Pa.

[21] Appl. No.: 09/224,691

[22] Filed: Jan. 4, 1999

[51] Int. Cl.[7] ............................. B32B 5/16; B01D 24/00; B01D 39/06
[52] U.S. Cl. ................... 428/405; 210/198.3; 210/282; 210/502.1; 210/504; 210/506; 210/616
[58] Field of Search .................................. 428/403, 404, 428/405; 210/616, 263, 282, 198.3, 502.1, 504, 506

[56] References Cited

U.S. PATENT DOCUMENTS

| | | | |
|---|---|---|---|
| 4,415,631 | 11/1983 | Schutjser | 428/405 |
| 4,640,909 | 2/1987 | Ramsden et al. | 502/407 |
| 4,680,120 | 7/1987 | Ramsden et al. | 210/635 |
| 4,724,207 | 2/1988 | Hou et al. | 435/180 |
| 4,950,634 | 8/1990 | Williams et al. | 502/401 |
| 4,962,217 | 10/1990 | Katayama et al. | 556/427 |
| 5,011,410 | 4/1991 | Culler et al. | 433/208 |
| 5,137,626 | 8/1992 | Parry et al. | 210/198.2 |
| 5,545,317 | 8/1996 | Williams | 210/198.2 |
| 5,824,226 | 10/1998 | Boyd et al. | 210/679 |
| 5,831,073 | 11/1998 | Rokita et al. | 536/26.6 |
| 5,843,312 | 12/1998 | Manz et al. | 210/635 |
| 5,945,172 | 8/1999 | Yamaya et al. | 427/503 |

OTHER PUBLICATIONS

Ferrara, S.D., "Therapeutic gamma–hydroxybutyric acid monitoring in plasma and urine by gas chromatography–mass spectroscopy," J. of Pharmacology and Biomedical Analysis, vol. 11, No. 6, pp. 483–487, 1993.

Andrews, K., "Getting the scoop on GHB: the new recreational drug," Workshop at 49th Annual Meeting of the American Academy of Forensic Sciences, Feb. 17–22, 1997.

Letteri, J. et al., Determination of gamma–hydroxybutyric acid in human urine, J. of Pharmacology and Experimental Therapeutics, vol. 208, pp. 7–11, 1979.

Mesmer, M.Z., et al., "Determination of gamma–hydroxybutyrate (GHB) and gamma–butyrolactone (GBL) by HPLC/VIS Spectrophotometry and HPLC/thermospray mass spectrometry," J. of Forensic Sciences, vol. 43, No. 3, pp. 489–492, May, 1998.

Gibson, K.M., et al., "Stable isotope dilution analysis of 4–hydroxybutyric acid: an accurate method for quantification in physiological fluids and the prenatal diagnosis of 4–hydroxybutyric aciduria," Biomed. and Environ. Mass Spectrometry, vol. 19, pp. 89–93, 1990.

Fieler, E.L., et al., "Gamma–hydroxybutyrate concentrations in pre– and postmortem blood and urine," Clinical Chemistry, vol. 44, No. 3, p. 692, 1998.

Frommhold, S., "Gamma–hydroxybutyrate (GHB): what's 'the scoop'?," Toxi–News, vol. 16, No. 1, pp. 3–10, 1997.

*Primary Examiner*—H. Thi Le
*Attorney, Agent, or Firm*—Robert A. Koons, Jr.; James W. Bolcsak

[57] ABSTRACT

A treated silica composition particularly useful for solid phase extraction in chemical analysis, the silica having both phenyl and propylsulfonic acid functional groups; a cartridge for extraction which comprises the treated silica; a column for extraction which comprises the treated silica; and a method for solid phase extraction which uses the silica composition. A method for analysis of gamma hydroxybutyric acid is also disclosed which uses the treated silica.

20 Claims, No Drawings

EXTRACTION MATERIAL COMPRISING TREATED SILICA AND METHOD FOR DETERMINATION OF GAMMA-HYDROXYBUTYRATE

BACKGROUND

1. Field of the Invention

The invention relates to a novel treated silica which is useful for analytical sample preparation by solid phase extraction, and to a method of use of this novel silica. More specifically, the invention relates to a silica treated with phenyltrichlorosilane and with 3-mercaptopropyltrimethoxysilane, to a solid phase extraction cartridge and an extraction column comprising the treated silica of the invention, and to a method of using the silica of the invention for sample preparation and analysis. The novel silica, column and method are all particularly well suited for use in the determination of gamma hydroxybutyric acid (GHB). Gamma hydroxybutyric acid, also known as 4-hydroxybutyric acid and having the Chemical Abstracts Service Registry Number 591-81-1, is a pharmaceutical which has been used for treatment of alcohol abuse and as a treatment for narcolepsy. GHB as used herein also refers to any salt form of gamma hydroxybutyric acid. GHB is also sometimes used as a drug of abuse. GHB has also been used recently as a "date rape drug", being used to render a victim disoriented or unconscious. The disclosure of the present invention is directed to a novel method for analysis of GHB in samples, and to a novel composition useful for solid phase extraction methods used in analytical chemistry. The treated silica is believed to be functionalized with both propylsulfonic acid groups and phenyl groups as a result of the treatment.

Solid phase extraction is a method used for sample preparation in analytical chemistry. In solid phase extraction, a solid sorbent material is used to contact a solution being analyzed. An analyte of interest may be bound reversibly and selectively by the sorbent material, thereby separating it from an interfering substance which may be present in the solution. Alternatively, the sorbent material may be used to selectively bind an interfering substance present in the solution, and thereby separate that substance from the analyte of interest which is left in the solution. The treated silica of the present invention may be used as a sorbent material in either of these ways to effect separations for use in analytical chemistry.

Solid phase extraction methods are frequently carried out using a sorbent material which is carried within an extraction device such as a cartridge or a column. The extraction device is designed to be inexpensive to manufacture and therefore disposable after a single use. These extraction devices are generally tubular in shape, and sized to fit either a syringe or a vacuum manifold. The sorbent material used with such an extraction device is held in place within the cartridge or column by a frit selected for its ability to retain the sorbent material, while allowing a solvent to pass through the cartridge or column. The present invention encompasses both a cartridge extraction device and a column extraction device within its scope.

2. Description of the Related Art

Terms used in this disclosure are defined as follows:
GHB—gamma hydroxybutyric acid (also known as 4-hydroxybutyric acid ) or a salt of gamma hydroxybutyrate (also known as 4-hydroxybutyrate), wherein the salt is an alkali metal salt
GBL—gamma butyrolactone
GC—gas chromatography
MS—mass spectrometry
GC-MS—gas chromatography-mass spectrometry
HPLC—high performance liquid chromatography
SPE—solid phase extraction
TMCS—trimethylchlorosilane
BSTFA—bis(trimethylsilyl)trifluoroacetamide—used as BSTFA/TMCS mixture
TMS—trimethylsilyl
D6-GHB—deuterated gamma hydroxybutyric acid
SIM—selected ion monitoring
C-18—octadecyl
UV—ultraviolet
VS—visible At injector temperatures used for gas chromatography, GHB is readily converted to gamma butyrolactone. Lower elution temperature delays the elution of the lactone but the lactone often gives broad peaks. Procedures are known in the art for determining the lactone in urine specimens, but the lactone can be legally possessed in some jurisdictions. The free acid or salt form of GHB is a scheduled drug, that is a drug whose possession is regulated by the United States Drug Enforcement Administration. There exists an unfulfilled need for a method for determining GHB in samples such as biological samples or body fluids, which method would be definitive. That is, the method should measure GHB present in the sample which is present as either the free acid or salt, but whose results would not be affected by the presence of gamma butyrolactone in the same sample. The method should be one which can provide definitive proof of the presence of the controlled substance form of GHB in a sample. The results determined with such a method would be of great value to law enforcement officials for providing evidence of illicit drug use. Since the lactone GBL is not a controlled substance, it is highly desirable to have an analytical method for GHB which can determine GHB quantitatively without interference from GBL. In short, having GHB in a subject's urine is evidence of the commission of a crime while having GBL in the subject's urine may not be a crime. Currently, forensic and clinical laboratories analyze for GHB by extracting GHB from urine samples by conversion to GBL by acidification, followed by extraction into either chloroform or ether, and then using capillary GC analysis with either flame ionization detection or mass spectrometry to quantitate GBL. This method does not directly measure GHB however, but rather the lactone. This method then is not a definitive test for GHB, but instead measures GHB as well as any GBL in a sample. Since GBL is not a scheduled drug, this will not provide firm scientific evidence needed in court to obtain a conviction on drug charges. A definitive test for GHB, which would measure the free acid or salt in a sample, and which can distinguish GHB from the lactone GBL, would be of value to forensic laboratories.

Preferably, a method for determination of GHB should also be useful for analysis of GHB from samples other than biological samples as well. Examples of these other samples include but are not limited to oils, extracts, elixirs and beverages which might contain GHB; and which are suspected as being intended for illicit administration to people.

The short half life of GHB after administration to a subject is also a problem for detection of the drug. The half life is reported to be less than one hour. Peak urine concentrations after ingestion are observed at about 4 hours. No drug is detected after 12 hours from ingestion. Less than 5% of an oral dose is excreted in urine as the unchanged drug (S. D. Ferrara et al., Therapeutic gamma-hydroxybutyric acid monitoring in plasma and urine by gas chromatography-mass spectroscopy, Journal of Pharmacology and Biomedical Analysis, 11:6, 483–487, 1993). For an analytical method for determination of GHB to be of practical use it must be suited for rapid use when a sample suspected to contain GHB becomes available.

Currently available choices for analytical methods which might be suitable for GHB are limited. GHB has been reported to have very low absorption in the ultraviolet region. Because of this, HPLC analysis would require refractive index detection. This would clearly not provide a very sensitive detection method, and would present a serious problem with respect to obtaining sufficient resolution from interfering substances. The use of capillary electrophoresis would be faced with the same limitations of detection. Derivatization of GHB would be required to introduce a chromophore into GHB which would allow more sensitive detection using separation methods such as HPLC or capillary electrophoresis.

GHB is not readily determined by gas chromatography (GC). At temperatures above about 140° C., GHB is converted to gamma butyrolactone (GBL) in an injection port. This indicates that derivatization such as silylation would be desirable to prevent formation of the lactone and adds to volatility of GHB prior to injection onto a GC column. Coupling of separation by gas chromatography with mass spectroscopic determination of the separated analytes is a problem with GHB because the mass spectra for GHB and the lactone GBL have been reported to be nearly identical. This problem has been discussed in Kathleen Andrews, Getting the Scoop on GHB: The New Recreational Drug, Workshop at 49th Annual Meeting of the American Academy of Forensic Sciences, Feb. 17–22, 1997.

The lack of suitable analytical methods for GHB which can serve as a definitive test for the presence of this drug in samples such as urine has been indicated by those working in the area (J. Letteri and H. Fung, Determination of Gamma-hydroxybutyrate acid in human urine, Journal of Pharmacology and Experimental Therapeutics, 208, 7–11, 1979).

A method for determining GHB has been reported by Andrews (Getting the Scoop on GHB: The New Recreational Drug, Workshop at 49th Annual Meeting of the American Academy of Forensic Sciences, Feb. 17–22, 1997) in which GHB is converted to its lactone prior to extraction by heating under acidic conditions. This method used an internal standard, α-methylene-γ-butyrolactone. The extracts were subjected to capillary gas chromatography for quantitation of the GBL present. This method suffers the disadvantage of not being definitive for GHB. That is, this method does not measure GHB itself in a sample but rather measures GHB in addition to any GBL which may be present in the sample. This reported method comprises the steps: a) adding the internal standard to a sample; b) adding a quantity of sulfuric acid for acidification; c) centrifuging the sample; d) decanting the supernatant; e) adjusting the pH to between 6 and 7; f) centrifuging again; g) adding n-butyl chloride to the supernatant; h) centrifuging again; i) removing the solvent layer; j) reducing the solvent volume by evaporation; and k) submitting a sample of the solvent layer to gas chromatography on a capillary column with flame ionization detection.

As disclosed in M. Z. Mesmer and R. D. Satzger, Determination of Gamma-Hydroxybutyrate (GHB) and Gamma-Butyrolactone (GBL) by HPLC/UV-VIS Spectrophotometry and HPLC/Thermospray Mass Spectrometry, in J. of Forensic Sci., 43(3), 489–492, May, 1998, GHB may be determined by two HPLC methods. The first of these methods consists of HPLC on a C-18 reversed phase column with UV (ultraviolet) detection at 215 nm. This method would be applicable only with samples which had a very low content of UV absorbing substances. The second method disclosed in Mesmer consists of HPLC separation coupled with mass spectrometry. This method disclosed by Mesmer was indicated in the disclosure as suited for application to "illegal preparations that are available on the black market" which might contain GHB. This second method provided in this disclosure has a sample of a suspected illegal preparation subjected to separation by HPLC on a C-18 reversed phase column, coupled with thermospray mass spectrometry for detection of GBL and GHB resolved by the column. The method disclosed was described by the authors as "capable of differentiating between GHB and its lactone, GBL", but was described as having sensitivity for analysis of illegal preparations only. The method disclosed by Mesmer was not indicated as having enough sensitivity to allow detection in samples taken from a human subject suspected as having ingested GHB. A sample of GHB suitable for illicit sale would be expected to have a high concentration of GHB, although some inactive diluent might also be present. The concentration in an illegal preparation for sale would certainly be much higher than would be expected for a sample taken from a subject suspected to have ingested GHB. This disadvantageous lack of sensitivity is believed to be overcome by the method of the present invention and the use of the novel silica disclosed herein.

As disclosed in K. M. Gibson et al., Stable Isotope Dilution Analysis of 4-Hydroxybutyric Acid: An Accurate Method for Quantification in Physiological Fluids and the Prenatal Diagnosis of 4-Hydroxybutyric Aciduria, in Biomed. and Environ. Mass Spectrometry, 19, 89–93, 1990; GHB may be determined quantitatively by use of isotope dilution with deuterated GHB being used. In this publication the analyte being determined was the butyrolactone, GBL. That is, GHB in a sample was converted in the method of Gibson to GBL by acidification. GBL was then separated on a silicic acid column from other substances present in the sample. And subsequently, GBL eluted from the silicic acid column was trimethylsilylated for further separation and quantitation by GC-MS. Deuterated GBL (D6-butyrolactone) was added to the sample before acidification and adsorption with silicic acid to provide for isotope dilution. This method suffers from the disadvantage that GHB is not directly determined. That is, the method of Gibson is not definitive for GHB. According to the method disclosed in Gibson, a sample is acidified for conversion of any GHB in the sample to GBL. This step allows the use of D6-GBL as a stable isotope dilution internal standard to allow for any sample loss which might occur during the steps of the method. The method of Gibson then performs a separation of GBL by chromatography on silicic acid. By this method then, a sample which might originally contain the lactone, GBL, but no GHB; would give a result similar to that which would be obtained for a sample which would originally contain an ecluivalent amount of GHB and no lactone. Therefore, the method disclosed by Gibson is not definitive for GHB, and might not provide suitable scientific evidence for supporting criminal charges of illicit use of GHB.

All of the reported methods for analysis of GHB therefore have limitations or shortcomings to their use for forensic use.

OBJECTS OF THE INVENTION

Accordingly, to overcome the limitations and shortcomings of the prior art procedures and methods, it is an object of the present invention to provide an improved material for use in solid phase extraction for analytical sample preparation applications.

It is another object of the invention to provide an improved material for use in solid phase extraction of GHB from analytical samples, including biological samples.

It is another object of the invention to provide a new and improved method for preparing a sample for GC-MS analysis for GHB with improved sensitivity over previous methods for the determination and quantitation of GHB.

It is another object of the invention to provide an improved solid phase extraction device, such as a column and a cartridge, for analytical chemistry applications.

It is another object of the invention to provide a test kit for analysis of analytes where the kit comprises an improved material effective as a solid phase extraction material.

It is another object of the invention to provide a test kit for analysis of GHB in samples.

It is another object of the invention to provide a method for the sensitive and definitive determination of GHB in biological samples or biological matrices from a subject.

It is yet another object of the invention to provide a method for the sensitive and definitive determination of GHB in urine from a subject.

Other objects will become apparent from the description of the invention which follows.

SUMMARY OF THE INVENTION

Briefly, the invention comprises a novel extraction material composition for use in solid phase extraction of an analyte from a solution, the material comprising silica which has been treated with phenyltrichlorosilane and with 3-mercaptopropyltrimethoxysilane. This treated silica is presumed to carry both propylsulfonic acid groups and phenyl groups. Preferably, the composition of the invention comprises a silica which has been chemically treated to have both propylsulfonic acid functional groups and phenyl functional groups, and which is of a particle size which makes the silica composition useful as a sorbent for analytical sample preparation. When formed, the composition of the present invention preferably has the ability to retain sufficient interfering substances from a solution containing GHB to allow quantitative measurement of the GHB content of the solution. The invention also comprises a method for solid phase extraction using the novel composition. More particularly, the invention comprises a method for quantitative determination of gamma hydroxybutyric acid and gamma hydroxybutyrate in samples which may contain interfering substances of biological origin, and may also contain gamma butyrolactone.

The invention also encompasses an extraction cartridge containing the novel derivatized silica composition described herein. The extraction cartridge is useful for carrying out solid phase extraction of analytical samples. The extraction cartridge encompassed may have a tubular form, may be disk shaped or have some other shape. The invention also includes an extraction column for solid phase extraction of analytical samples.

The method of the invention involves separation of GHB from a sample for analysis. The sample may be a composition which is suspected of containing GHB in concentrated form in solution. An example of such a composition is a sample taken from suspected drug dealer. Alternatively, the sample may be a biological sample, such as a quantity of urine, serum, or whole blood which is suspected of containing GHB. The method of the invention uses a silica composition treated according to the invention to separate interfering substances from GHB in a sample. This method results in a purification of GHB from interfering substances which is sufficient to allow GHB to be determined quantitatively.

The new treated silica, extraction devices and method allow purification of GHB from interfering substances frequently present in biological samples sufficiently to make subsequent analysis by chromatography more effective than in currently available methods.

While the exact mechanism of operation is not known, nitrogenous products found in sample matrices such as urine are thought to be retained by the propylsulfonic acid group of a treated silica prepared according to the invention, through a cation exchange mechanism. Ring compounds such as tryptophan, indoles or biogenic amines, which may be present in urine or other biological samples, are thought to be retained by the phenyl functional group of a silica sorbent according to the invention. Hydrophobic interactions are believed to the mechanism for this latter retention. The silica of the present invention is a novel composition having received two treatments with silane reagents. It is believed that the inventive silica has a novel capability to bind substances. This novel capability is demonstrated by its utility in providing a solid phase extraction method for preparing samples for GHB analysis, where there has been a long unfulfilled need for such a method. The present invention is not to be limited by the theory of operation presented here however, but is limited only by the appended claims.

DETAILED DESCRIPTION OF THE INVENTION

We have discovered a treated silica which provides unique properties useful for solid phase extraction in analytical chemistry. While the treated silica according to the present invention has other uses, it is particularly well suited for use in solid phase extraction and particularly well suited for solid phase extraction used in GHB analysis.

The unique properties of the inventive treated silica is a result of two treatments. One treatment is achieved by contacting silica with phenyltrichlorosilane. The other treatment is achieved by contacting the silica with 3-mercaptopropyltrimethoxysilane, followed by contacting the resulting silica with water. Treating a silica with both of these treatments leads surprisingly to a novel treated silica having an ability to purify analytes by solid phase extraction which is unique and previously unreported for any silica. Use of either treatment alone does not result in a silica with the unique and new properties of the inventive silica, and the ability to purify GHB by solid phase extraction.

We have also discovered a novel method for determination of GHB in samples, which method is definitive for GHB in the presence of gamma butyrolactone and which method is quantitative for GHB. The novel method for GHB comprises solid phase extraction of a sample solution where interfering substances are retained sufficiently by the novel treated silica to allow any GHB present to be analyzed.

The novel treated silica can be better used in solid phase extraction techniques when used in the form of an extraction cartridge or an extraction column, and the present invention encompasses such devices containing the treated silica. These extraction cartidges or columns are generally tubular in shape or sometimes disk shaped. The novel silica can also be supplied to a user in the form of a test kit which would contain a quantity of the new silica sorbent, and which might also contain other needed materials such as a chromatographic separation column, standards and a method of separation.

The inventive treated silica may be of particle sizes from about 5 to about 300 μm. It is preferred that the silica be of particle sizes from about 30 to about 80 pm, and it is most preferred that the silica be of from about 40 to about 63 μm in size. Preferably, the treated silica is made by treating an amorphous silica. It is also preferred that the silica to be treated is porous. However, other types of silica can also be used in practicing the invention, such as a nonporous or a pellicular silica.

The treated silica disclosed here can be used effectively as a solid phase sorbent in the analysis of many drugs other than GHB. Examples of drugs which have been quantified using the novel silica include: acetopromazine, acetaminophen, amantadine, amitriptyline, amphetamine, apomorphine, azaperone, barbiturates, benzocaine, benzoic acid, benzoylecgonine, benztropine, buspirone, caffeine, carbamazepine, carisoprodol, chlordiazepoxide, chloroquine, chlorpheniramine, chlorpromazine, chlorpropamide, clenbuterol, clonazepam, cocaine, codeine, cotinine, cresol, cyclobenzaprine, dextromethorphan, dextrophan, diazepam, dihydrocodeine, diltiazem, diphenhydramine, dipyrone, doxepin, doxylamine, ecgonine, ethacrynic acid, etolphine, fentanyl, floxin, fluoxetine, furosemide, glutethimide, glycopyrrolate, hydrocortisone, hydromorphone, ibuprophen, imipramine, indomethacin, ketamine, lidocaine, loxapine, mazindol, meclizine, mefenamic acid, meperidine, meprobamate, methadone, methamphetamine, methyl benzoate, methyl ecgonine, methyl p-aminobenzoate, methylphenidate, methyl salicylate, methylparaben, methylprylon, metolazone, morphine, N-N-diethyltryptamine, naloxone, naproxen, nicotine, nordiazepam, nubain, oxybutynin, oxycodone, pemoline, pentazocine, phencyclidine, phenethylamine, phentermine, phenylbutazone, 1-phenylcyclohexone, phenylpropanolamine, phenytoin, primidone, procaine, propionylpromazine, propoxyphene, propranolol, propylparaben, quinidine, quinine, salbutamol, salicylic acid, strychnine, temazepam, terbutaline, tetracaine, tetrahydrocannabinol, theophylline, thiopental, thioridazine, timolol, tranylcypromine, trifluoperazine, trimethoprim, trimipramine, and verapamil.

The new treated silica can also be used effectively in the analytical determination ot drug metabolites. Examples of metabolites which have been successfully determined using this silica include: azaperone-5-glucuronide, etorphine-3-glucuronide, morphine-3-glucuronide, and nalorphine-3-glucuronide.

The invention will now be described through illustrative examples. The examples included here are not intended to limit the scope of the invention, which is defined in the appended claims.

EXAMPLE 1

A silica composition in accordance with the invention was produced by treating a silica by a method comprising the following steps. The silica used was an amorphous form of silica, comprising irregular particles having a particle size distribution of from about 40 to about 63 pm, and having a mean porosity of about 6.0 nm. The silica was reacted with phenyltrichlorosilane in a mixture of methylene chloride and water, the silane being slowly added to a suspension of the silica in the solvents. The reaction mixture was then washed with methanol (5 liters per kilogram). The reacted silica was then treated with water at 80° C. by suspending the silica in water, at 1.5 liters of water to 1 kg of silica. The reacted silica was then washed with 3 liters of water. The silica was then washed with 3 liters of room temperature water until the eluant was at pH of 4.5. The silica was then washed with 2 liters of methanol. Then, the silica was dried under vacuum at 70° C. and about 508 torr. The treated silica was then suspended in methylene chloride and glacial acetic acid. To the suspension was added slowly 3-mercaptopropyltrimethoxysilane. The silica was then separated from the suspension solvent solution by filtration, and then washed with 1 liter of methanol followed by two washes with 2 liters of methanol. Hydrolysis of the mercapto group to a sulfonic acid was carried out by adding to the silica hot aqueous 4.2 percent hydrogen peroxide, using 1.5 liters of 4.2% hydrogen peroxide at 80° C., followed by 1.5 liters of 4.2 percent hydrogen peroxide, and allowing the resulting silica to stand for 30 minutes. A second hydrolysis was then carried out by addition of 1.5 liters of purified water at 80° C. to suspend the silica, followed by suspending in 3 liters of water to hydrolyze the silica. This hydrolysis was allowed to proceed for 30 minutes. The silica was then washed with 3 liters of room temperature purified water until the pH of the eluant was 4.5. Washing of the silica with 2 liters of methanol was then carried out. The final derivatized silica was then dried under vacuum at 70° C. and about 500 torr for 14 hours, to yield a dry silica composition suitable for use as an absorbent for solid phase extraction.

EXAMPLE 2

A method for analysis in accordance with the invention was carried out by performing the following steps. The analyte determined in this example was GHB.

a) A 200 μL sample of human urine was placed into a screw topped test tube and 100 μL of D6-GHB was added, as well as 200 μL of a 0.1 M phosphate buffer at pH 6.0.

b) The sample was mixed by vortex mixing.

c) A solid phase extraction column according to the invention was conditioned in a vacuum manifold with 3 mL of methanol, 3 mL of distilled water and 1 mL of 0.1 M phosphate buffer at pH 6.0 in turn.

d) Aspiration of the phosphate buffer from the extraction column was performed.

e) A labeled tube was placed into the vacuum manifold for collecting the solvent.

f) The sample was decanted onto the solid phase extraction column at a vacuum of less than 51 torr.

g) The column was rinsed with 1 mL of methanol, with the methanol aspirated into a fresh collection tube.

h) The collection tube was removed from the vacuum manifold and taken to dryness under a stream of nitrogen at 60° C.

i) 1 mL of hexane saturated with acetonitrile was added to the tube.

j) 200 μL of derivatization grade acetonitrile were added to the tube.

k) The tube was capped and mixed by inversion for 5–10 minutes.

l) The tube was then centrifuged at 3,000 rpm for 5 minutes.

m) The lower layer (acetonitrile) was transferred to a clean tube.

n) The acetonitrile layer was taken to dryness with a stream of nitrogen at 40° C.

o) 50 μL of derivatization grade acetonitrile were added to the tube, followed by 50 μL of BSTFA with 1% TMCS.

p) The tube was heated at 60° C. for 5 minutes.

q) The tube was cooled to room temperature.
r) The solution in the tube was transferred to a limited volume insert in an autosampler vial for analysis by GC-MS under the conditions shown as follows:

| GC conditions | |
| --- | --- |
| Column head pressure | 8 psi |
| injection port temperature | 250° C. |
| Transfer line temperature | 280° C. |
| septum purge flow | 50 mL/min |
| equilibration time | 0.5 min |
| purge on time | 0.5 min |
| injection volume | 1 μL, splitless |

Oven Program
initial temperature 70° C., hold for 1.00 min
ramp to 100° C. at 15° C/min
ramp to 250° C. at 25° C./min Selected ion monitoring (SIM) was used for three ions for each analyte. The dwell times were set to 50 milliseconds per ion. The most prevalent ions for GHB-diTMS are 147, 233, 148, 149, 204, 143, and 234 m/z. The most prevalent ions for GHB-D6-diTMS are 147, 239, 148, 149, 206, and 240 m/z. Urea was also derivatized by BSTFA to form a TMS derivative. The trimethylsilylated product from urea elutes near GHB-diTMS and has many of the same ions, including 147, 148 and 149; therefore some of the less abundant ions must be used for the SIM analysis. These include those shown as follows:

| RT (min) | Name | Base Ion | 2nd Ion | 3rd Ion |
| --- | --- | --- | --- | --- |
| 5.90 | GHB-D6-diTMS | 239.2 (100) | 240.2 (20) | 241.1 (10) |
| 5.93 | GHB-diTMS | 233.1 (100) | 14301 (29) | 23401 (19) |

EXAMPLE 3

Samples of urine were analyzed for GHB by the following procedure. This procedure differed from that in Example 2 primarily by further including a step wherein urease was added to the samples to break down urea present in the samples.

a) 100 μL of GHB-D6 solution were added (100 ng/μL) to each sample in 13×100 mm culture tubes.
b) 200 μL of blank urine was added to each tube, both to tubes for blanks and for standard samples.
c) To tubes for standards was added 2–40 μg of GHB (equivalent to 10–200 mg/mL).
d) 200 μL of the case sample urine was added to a selected sample tube.
e) 200 μL of 0.1 M pH 6.0 phosphate buffer was added to each of the tubes.
f) All of the tubes were subjected to vortex mixing.
g) 27 units of urease from jack bean meal were added to each of tube of urine sample and standard.
h) All of the tubes were subjected to vortex mixing.
i) All of the tubes were allowed to stand for 10 minutes at room temperature.
j) Extraction columns containing a silica according to the invention were conditioned by washing each column with 3 mL of methanol, followed by 3 mL deionized water, and then 1 mL of 0.1 M phosphate pH 6.0 buffer on a vacuum manifold.
k) Each conditioned column was then aspirated by vacuum.
l) Labeled collection tubes were then placed in the vacuum manifold, under corresponding extraction columns.
m) Urease treated samples were then decanted onto corresponding columns with a vacuum of about 51 torr.
n) Each column was washed with 1 mL methanol by drawing a vacuum.
o) The tubes were removed from the vacuum manifold and the contents taken to dryness with a stream of nitrogen at 60° C.
p) To each tube was added 1 mL of hexane saturated with acetonitrile.
q) 200 μL of derivatization grade acetonitrile were then added to each tube.
r) Each tube was capped and its contents mixed by inversion for 5–10 minutes.
s) The tubes were then centrifuged for 5 minutes.
t) The lower acetonitrile layer of each tube was transferred to a clean 13×100 mm screw cap tube.
u) The samples in the tubes were taken to dryness by a stream of nitrogen or air at 40° C.
v) 50 μL of derivatization grade acetonitrile were added to each tube, followed by 50 μL BSTFA with 1% TMCS.
w) The sample tubes were then heated at 60° C. for 5 minutes.
x) The tubes were then cooled to room temperature.
y) The solutions in the tubes were then transferred to autosampler vials for GC-MS analysis.

Subsequent analysis by GC-MS was performed using the procedure outlined in Example 2 hereinabove. By using an additional step comprising treatment with urease the monitoring of less prevalent ions of GHB was no longer necessitated. Monitoring was then performed at 147 and 148 m/z for GHB. Greater sensitivity resulted from this procedure with the urease treatment. Full spectrum scanning was then possible as well, allowing more complete library searching.

The present invention is not to be limited in scope by the embodiments disclosed herein, which are intended as single illustrations of one aspect of the invention, and any which are functionally equivalent are within the scope of the invention. Indeed, various modifications of the invention, in addition to those shown and described herein, will become apparent to those skilled in the art from the foregoing description. Such modifications are intended to fall within the scope of the appended claims. All patents, patent applications, and publications mentioned herein are hereby incorporated by reference.

We claim:

1. A treated silica, comprising:
a composition made by treating a particulate silica with phenyltrichlorosilane and with 3-mercaptopropyltrimethoxysilane.

2. The treated silica of claim 1,
wherein the treating with phenyltrichlorosilane and with 3-mercaptopropyltrimethoxysilane is performed in separate steps.

3. The treated silica of claim 1,
wherein the treated silica is characterized by an ability to separate interfering substances from GHB.

4. The treated silica of claim 1,
wherein the particulate silica is from about 5 to about 300 micrometers in size.

5. The treated silica of claim 4,
wherein the particulate silica is from about 30 to about 80 micrometers in size.

6. The treated silica of claim 5,
wherein the particulate silica is from about 40 to about 63 micrometers in size.

7. A treated silica having phenyl functional groups and propylsulfonic acid functional groups.

8. The treated silica of claim 7, wherein the treated silica is characterized by an ability to separate interfering substances from GHB.

9. The treated silica of claim 7, wherein the treated silica is from about 5 to about 300 micrometers in size.

10. The treated silica of claim 9, wherein the treated silica is from about 40 to about 63 micrometers in size.

11. An extraction device for use in solid phase extraction, comprising:

a housing; and a treated silica according to claim 7;

wherein the housing further comprises an elongate generally tubular body, and at least one frit for retaining the silica.

12. The extraction device of claim 11, wherein the device is a column.

13. The extraction device of claim 11, wherein the device is a cartridge.

14. A kit for determining an analyte in a sample, comprising an extraction device according to claim 11.

15. A method for solid phase extraction of a sample, comprising a step of introducing the sample into the extraction device of claim 11.

16. The method for solid phase extraction of a sample according to claim 15, wherein the sample is a body fluid.

17. The method for solid phase extraction of a sample according to claim 16, wherein the sample is urine.

18. A method for solid phase extraction of a sample, comprising a step of contacting the sample with the treated silica according to claim 7.

19. The method for solid phase extraction of a sample according to claim 18, wherein the sample is a body fluid.

20. The method for solid phase extraction of a sample according to claim 19, wherein the sample is urine.

* * * * *